April 3, 1956
G. L. SMITH
2,740,117
MACHINE FOR INSERTING HANDLE STICKS
INTO IMPALABLE ARTICLES
Filed March 5, 1953
2 Sheets-Sheet 1
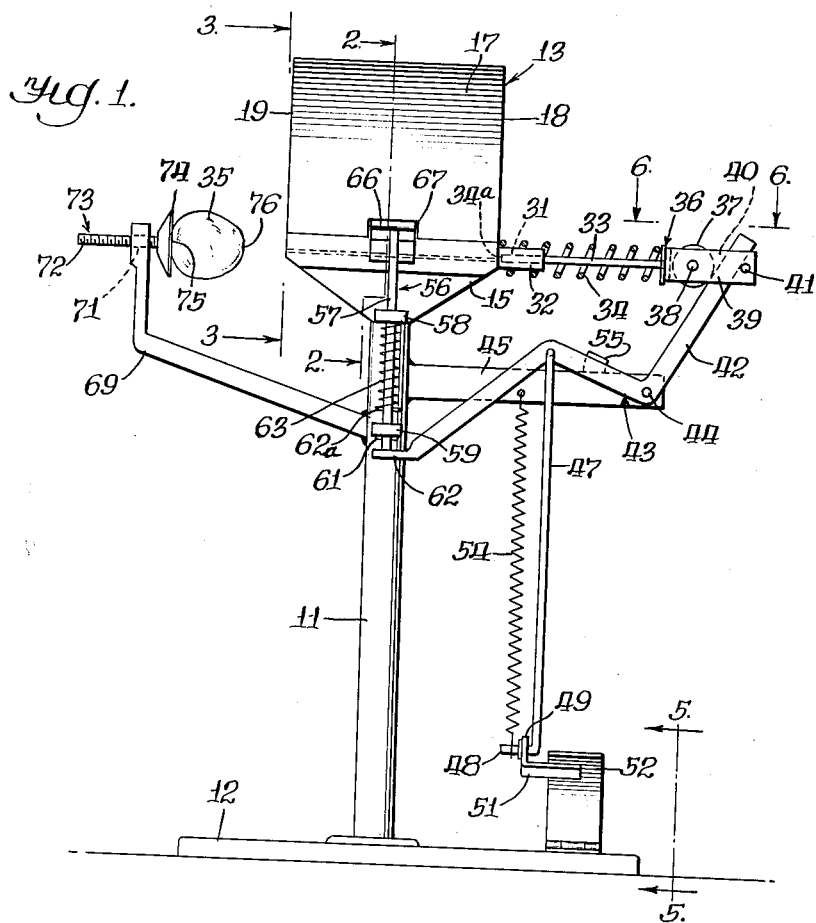
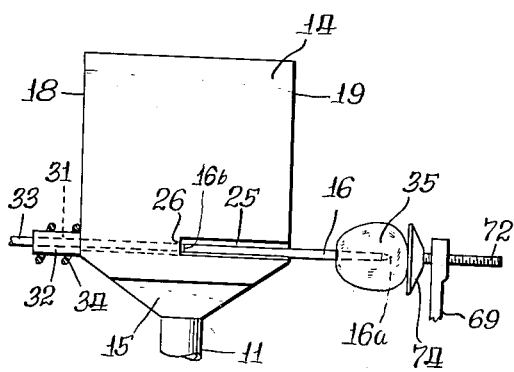
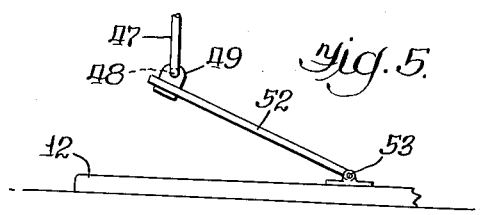
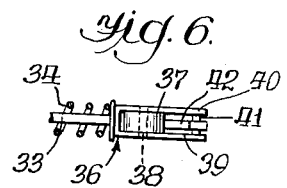
INVENTOR.
George Leslie Smith
BY
Atty.

April 3, 1956
G. L. SMITH
2,740,117
MACHINE FOR INSERTING HANDLE STICKS
INTO IMPALABLE ARTICLES
Filed March 5, 1953
2 Sheets-Sheet 2
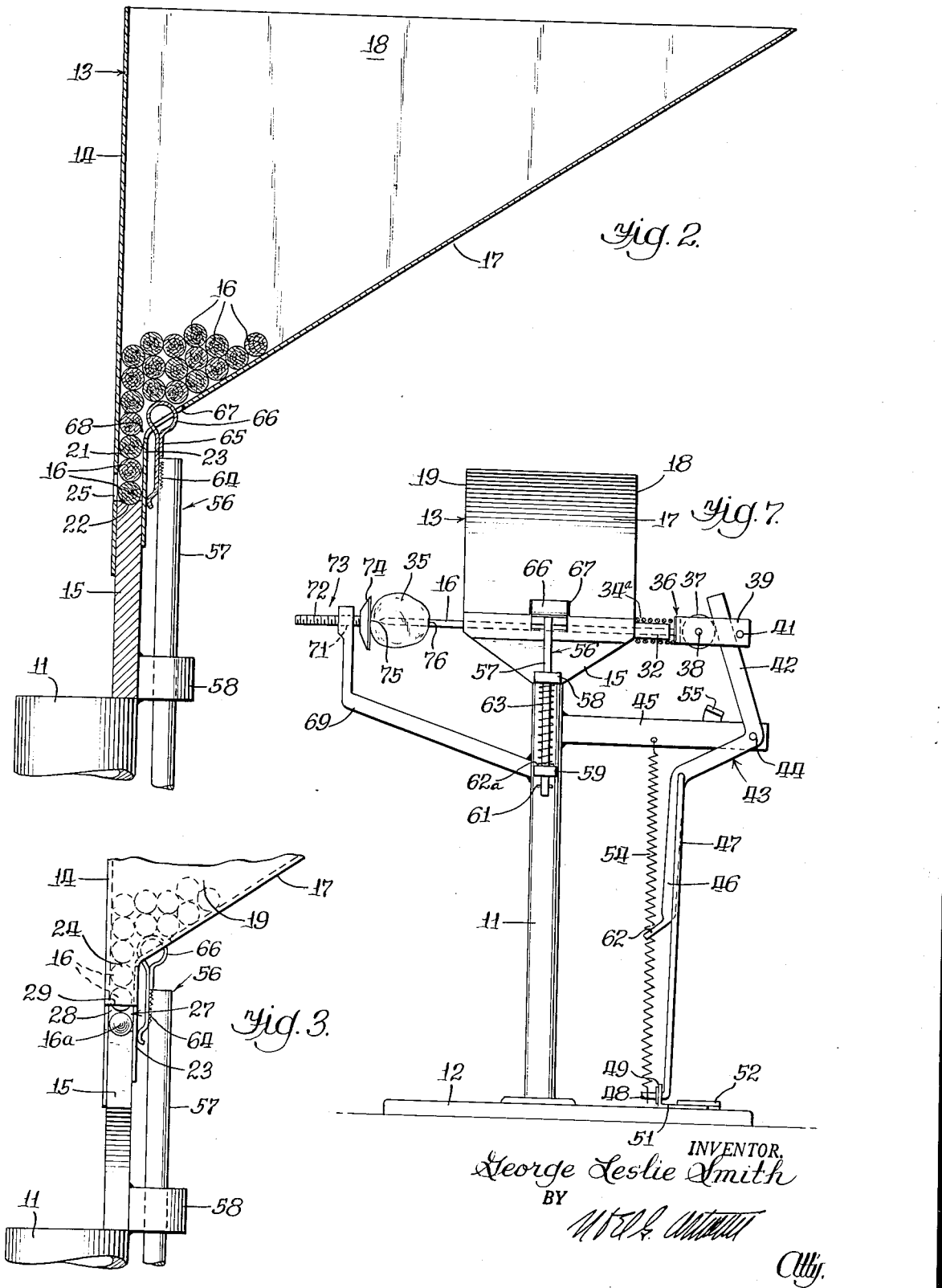
INVENTOR
George Leslie Smith

United States Patent Office 2,740,117
Patented Apr. 3, 1956

2,740,117

MACHINE FOR INSERTING HANDLE STICKS INTO IMPALABLE ARTICLES

George Leslie Smith, Rock Island, Ill.

Application March 5, 1953, Serial No. 340,601

1 Claim. (Cl. 1—1)

This invention concerns article feeding and discharge apparatus, and relates more in particular to a machine for successively delivering article impaling handle sticks into a discharge section thereof and including means for discharging the sticks endwise from such section into impalable articles.

The present invention is particularly useful in the art of inserting handle sticks into apples as part of a process of preparing candy-coated apples having a stick by which they may be held while being eaten. A general object of the invention is the provision of a machine for supplanting the manual step of inserting handle sticks into apples.

A further object is the provision of a stick-inserting machine having a hopper from which the sticks are successively delivered laterally into a section from which they are discharged endwise, and gauge means for predeterminedly spacing an apple axially from a stick in the discharge section wherefore the axially discharged stick is inserted a desired distance into the apple.

More specific objects of the invention are elucidated in the ensuing description, the appended claims and the annexed drawings, wherein:

Fig. 1 is a rear elevational view of a handle stick inserting machine embodying the principles of this invention.

Fig. 2 is a vertical sectional view taken through a stick-receiving chamber of the machine, the view being taken upon the plane indicated by the line 2—2 in Fig. 1.

Fig. 3 is a fragmentary view showing an end of the stick-receiving chamber and taken at the plane indicated by the line 3—3 in Fig. 1.

Fig. 4 is a fragmentary view showing the stick-receiving chamber of Fig. 1 in front elevation.

Fig. 5 is a fragmentary view taken on the line 5—5 of Fig. 1 and illustrating an operating pedal of the machine in side elevation.

Fig. 6 is a fragmentary view taken on the line 6—6 of Fig. 1.

Fig. 7 is a view illustrating parts of the machine in an operated position incurred by depressing the pedal shown in Figs. 1 and 5.

With continued reference to the drawings, the machine comprises a standard 11 rising vertically from a base 12. A stick-receiving hopper or chamber 13 is mounted upon the upper end of the standard 11. A front wall 14 of the hopper rises vertically from a front face of a plate 15 which has a thickness from front to back slightly in excess of the diameter of handle sticks 16 which may be formed of wood or other suitable material. The chamber 13 comprises a rear downwardly and forwardly sloping wall 17 and generally triangular end walls 18 and 19 extending between the front and rear walls 14 and 17. A stick-feeding passage 21 has a bottom formed by a semi-cylindrical cavity 22 in the upper edge of the plate 15. A front wall of the passage 21 is formed by a lower portion of the stick-receiving chamber wall 14 and a vertically depending portion 23 of the sloping front wall 17. End walls 24, one being shown in Fig. 3, of the stick-feeding passage 21 are formed by narrow downward projections of the chamber end walls 18 and 19, respectively.

A horizontal slot-like opening 25 in the front wall of the passage 21 facilitates lateral removal of the lowermost stick 16 forwardly from the passage 21 subsequent to endwise advancement of this stick into an impalable article as illustrated in Fig. 7. When a stick is so advanced, the butt end thereof will be pushed slightly beyond the end 26 of the stick-discharge opening or slot 25; see Fig. 4.

The sticks 16 will normally be of a length substantially equal to the distance between the chamber end walls 18 and 19. Pointed ends 16a of the sticks will be adjacent the end wall 19 whereas the square cut butt ends 16b of the sticks will be adjacent the end wall 18. The lowermost stick 16 of a vertical column of sticks within the passage 21 registers with a stick-discharge section 27 having a discharge opening 28 formed between the lower edge 29 of the passage end wall 24 and the concave upper edge of the plate 15. The opposite end of the stick-discharge section 27 communicatively registers coaxially with a bearing bore 31 in a bearing 32 welded to the opposite end of the passage 21.

A stick-discharge plunger 33 shown retracted in Fig. 1 with the leading end 34a slightly retracted into the bearing bore 31 is advanceable leftward against the force of a compression spring 34 endwise against the butt end of the lowermost stick 16 to force the pointed end 16a thereof outwardly through the opening 28, Fig. 3, sufficiently far to penetrate an impalable article 35 as illustrated in Fig. 7. The outer end of the plunger 33 carries a bifurcated head 36 having a roller 37 journalled upon a pin 38 and locked between the furcations 39 and 40 of the head 36. A second pin 41 is also mounted in and extends between the furcations 39 and 40. One leg 42 of a lever 43 pivoted at 44 upon a standard-mounted arm 45 projects upwardly between the furcations 39 and 40 and also between the roller 37 and the pin 41. Another leg 46 of the lever 43 is pivotally connected with the upper end of an operating rod 47 of which a lower end portion 48 is turned at right angles to project through an apertured ear 49 of a bracket 51 attached to the lower side of a pedal 52. This pedal is inclined upwardly and rearwardly from a hinged connection 53 with the base 12 as illustrated in Fig. 5. The long contraction spring 54 is connected between the lower end portion 48 of the rod 47 and the standard-mounted arm 45 to cooperate with the spring 34 for holding the plunger 33 retracted outwardly and the pedal 52 retracted upwardly as illustrated in Figs. 1 and 5. The upward limit of movement of the pedal 52 and the clockwise limit of movement of the arm 43 about the pivot 44 are determined by a stop member 55 mounted upon the fixed arm 45 and abutted by the arm 43.

A stick agitator device 56 comprises a short rod 57, Figs. 1, 2 and 3, vertically slideable within bearings 58 and 59 between upper and lower limits determined by transverse cross pins 61 and 62a carried by said rod respectively abutting against lower and upper ends of the bearing 59. In Fig. 1, the rod 57 is held at its upper limit of movement by an end portion 62 of the lever arm 46 attendant to the lever 43 being maintained at its counter-clockwise limit of movement against the stop 55 by the spring 54. A light helical spring 63 surrounding the rod 57 and reacting between the bearing 58 and the cross pin 62a supplements gravitational force in moving the rod downwardly with the cross pin 62a against the upper end of the bearing 59 pursuant to depression of the pedal 52 and removal of the lever end portion 62 from the lower end of said rod.

The upper end of the rod 57 has welded thereto at 64 a sheet metal member 65 having a small cylindrical head 66 which is projected upwardly through an opening 67 formed adjacent the throat 68 of the downwardly converging chamber walls 14 and 17 (see Fig. 2) when the rod 57 is at the upper limit of its endwise movement. When the rod 57 is moved endwise downwardly attendant to abutment of the cross pin 62a with the bearing 59, the cylindrical agitator head 66 is withdrawn downwardly and outwardly through the small opening 67.

A gauge arm 69 fixed to and projecting laterally and upwardly from the standard 11 contains a threaded bore 71 wherein there is disposed a threaded stem 72 of a gauge member 73 having a gauge head 74 disposed in axial alignment with the stick-discharge section 27.

Operation of the machine

Preparatory to placing the machine in operation, the stick-receiving chamber or hopper 13 is filled or partially filled with the handle sticks 16. The sharpened or leading ends 16a of these sticks are placed adjacent the hopper end wall 19 while the square cut butt ends thereof are adjacent the hopper end wall 18. These sticks feed gravitationally down the converging walls 14 and 17 successively through the elongated throat 68 to form a vertical column of these sticks in single file within the stick-receiving passage 21. The lowermost of the sticks will rest upon the bottom of this passage within the semi-cylindrical cavity 22 formed within the upper edge of the hopper supporting plate 15; see Fig. 2. Springs 54 and 34 will be operative at this time to hold the plunger 33 retracted as illustrated in Fig. 1 to facilitate the lowermost stick 16 resting upon the bottom of the passage 21.

Next the position of the gauge member head 74 endwise from the stick-discharge section opening 28, Fig. 3, will be selectively adjusted by rotating the threaded stem 72 of this device within the threaded bore 71. This spacing of the gauge member head 74 from the stick-discharge section will be determined by the dimension of the impalable article 35.

The machine is primarily designed for inserting handle sticks 16 into apples constituting the impalable articles 35. When it is desired to insert a stick, assuming the article 35 to be an apple, the stem end 75 of the apple will be placed against the gauge head 74 whereas the calex end 76 will be placed in coaxial relation with the horizontal elongated stick-discharge section 27 of the machine. The apple is manually held in this position. While so held, the operator will depress the pedal 52, thereby pulling downwardly upon the rod 47 and pivoting the lever 43 counter-clockwise to the limit of movement illustrated in Fig. 7. Attendant to this counter-clockwise pivoting of the lever 43, the arm 42 thereof presses against the roller 37 and forces the plunger 33 axially inwardly of the stick-discharge passage 27 against the butt end 16b of the lowermost stick to advance the stick to the position illustrated in Figs. 4 and 7. The pointed end of the stick is thus caused to axially penetrate the apple 35 the desired distance and to have the butt end 16a thereof advanced beyond the end 26 of the stick removal slot through which the stick can be laterally removed by the article attendant to sliding the impaled article out of engagement with the gauge member head 74. Thereupon the operator will release the pedal 52 which is pulled upwardly by the spring 54 to lift the rod 47 and pivot the lever 43 clockwise to the Fig. 1 position. During this clockwise pivoting of the lever 43, the arm 42 thereof presses against the plunger head pin 41 and supplements the force of the spring 34 in retracting the plunger 33 to the Fig. 1 position. Incident to this retraction of the plunger 33 from the stick-discharge section 27 and the removal of the impaling stick from this discharge section 27, the stick therenextabove will drop into position preparatory to being inserted into an article 35 when the pedal 52 is next depressed.

Continued feeding of the sticks 13 into and through the throat 68 is expedited by the agitator 66 which is alternately projected upwardly against sticks about to enter the throat 68 and then retracted downwardly from within the opening 67 out of engagement with the sticks. Each time the pedal 52 is depressed, the lever section 62 is removed from the lower end of the agitator rod 57 so that the agitator head 66 is allowed to descend, and each time the pedal 52 is released, the spring 54, in pivoting the lever 43 clockwise, will cause the lever end portion 62 to abut the lower end of the rod 57 to again project the agitator head 66 upwardly into the opening 67.

Having thus described a single preferred form of the invention with the view of clearly and concisely illustrating the same, I claim:

In a machine for inserting elongated handle sticks into impalable articles, a pedestal comprising an upright column, a stick hopper mounted on the upper end of said column and extending vertically thereabove, said stick hopper having a stick receiving and feeding chamber at the bottom thereof, said chamber being open at each end thereof and aligned along a horizontal axis above said column, an arm mounted on said column to extend therefrom along a line parallel to said horizontal axis, a lever pivotally mounted intermediate the ends thereof on the outer end of said arm to pivot in a vertical plane generally including said horizontal axis, a stick discharge plunger mounted to project into one end of said chamber along said horizontal axis, roller means secured to the outer end of said plunger and cooperating with one end of said lever so that said plunger reciprocates in said chamber along said horizontal axis to successively discharge sticks from the other end of said chamber along said horizontal axis when said lever is reciprocally pivoted, foot lever means connected to said lever and operable by an operator to reciprocally pivot said lever, a second arm mounted on said column to extend therefrom in a vertical plane generally including said horizontal axis, a gauge head against which an impalable article is held by an operator, said gauge head having a threaded stem, said second arm having a cooperating threaded bore in the outer end thereof, said threaded bore positioned along said horizontal axis, said threaded stem inserted through said threaded bore whereby an impalable article held against said gauge head is positioned to adjustably intersect said horizontal axis, said second arm formed to position said gauge head sufficiently close to said other end of said chamber and said foot lever means so that one operator can operate said foot lever means while holding an impalable article against said gauge head to impale said article with a stick discharged from said other end of said chamber.

References Cited in the file of this patent

UNITED STATES PATENTS

| | | |
|---|---|---|
| 534,555 | Foster et al. | Feb. 19, 1895 |
| 1,274,216 | Fozzi | July 30, 1918 |
| 2,303,566 | Majestic | Dec. 1, 1942 |